United States Patent

[11] 3,556,076

| [72] | Inventor | Ronald B. Stewart<br>Freeport, Ill. |
|------|----------|---------------------------------|
| [21] | Appl. No. | 791,898 |
| [22] | Filed | Jan. 17, 1969 |
| [45] | Patented | Jan. 19, 1971 |
| [73] | Assignee | King-Seeley Thermos Co.<br>Ann Arbor, Mich.<br>a corporation of Delaware |

[54] PORTABLE BARBECUE GRILL
22 Claims, 5 Drawing Figs.

[52] U.S. Cl..................................................... 126/9,
126/25, 108/119, 126/25, 248/432
[51] Int. Cl....................................................... A47j 37/00,
F24b 3/00, F24c 1/16
[50] Field of Search............................................ 126/9,
25XV, 25A, 25B, ; 248/136, 163, 164, 432;
108/118, 119, 157, 159

[56] References Cited
UNITED STATES PATENTS

| 2,842,044 | 7/1958 | Kirk ............................. | 126/9UX |
| 3,265,019 | 8/1966 | Haydock ..................... | 108/119 |
| 3,386,430 | 6/1968 | Linstead....................... | 126/25A |

Primary Examiner—Charles J. Myhre
Attorney—Harness, Dickey & Pierce

ABSTRACT: A portable folding barbecue grill assembly comprising a brazier adapted to operatively support burning barbecue fuel; a pair of generally inverted U-shaped support legs each comprising a pair of spaced parallel support sections and a generally horizontally extending intermediate section, and a plurality of hook-shaped support brackets fixedly secured to the underside of the brazier and adapted to detachably receive and support the intermediate sections of the support legs, the support brackets and legs being arranged relative to the lower side of the brazier such that the intermediate leg sections are engageable with the undersurface thereof so as to releasably maintain the legs operatively engaged with the support brackets.

PATENTED JAN 19 1971

INVENTOR.
Ronald B. Stewart
BY
Harness, Dickey & Pierce
ATTORNEYS.

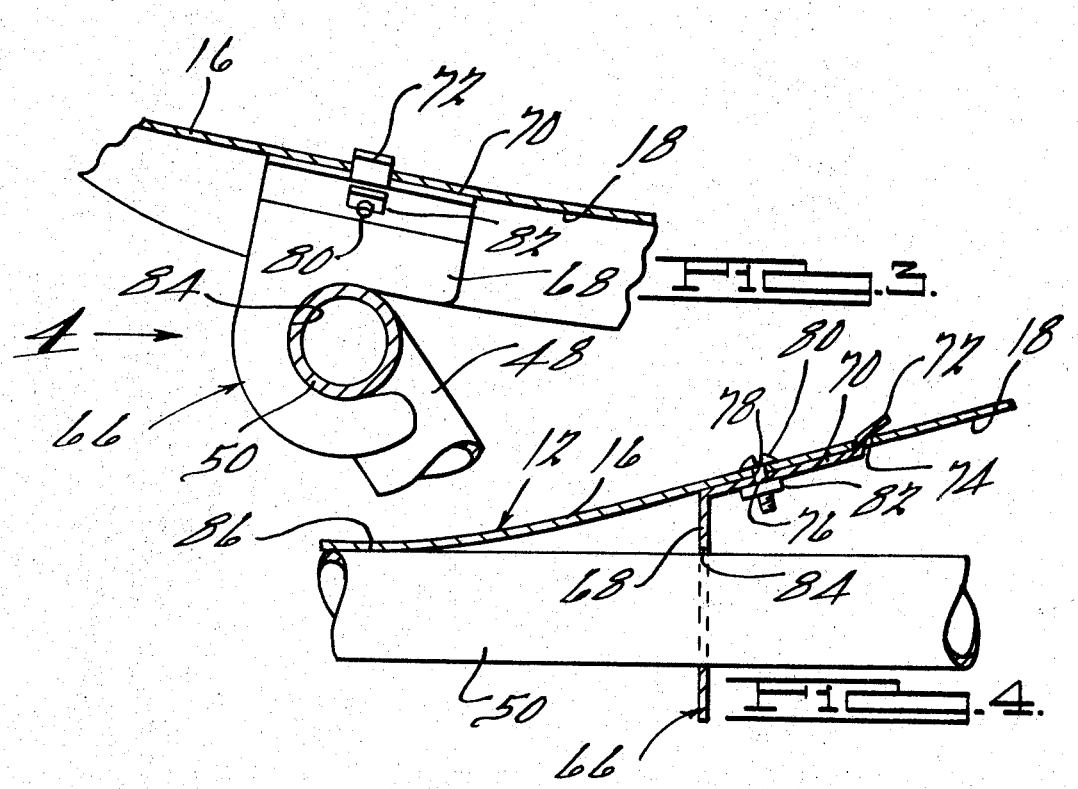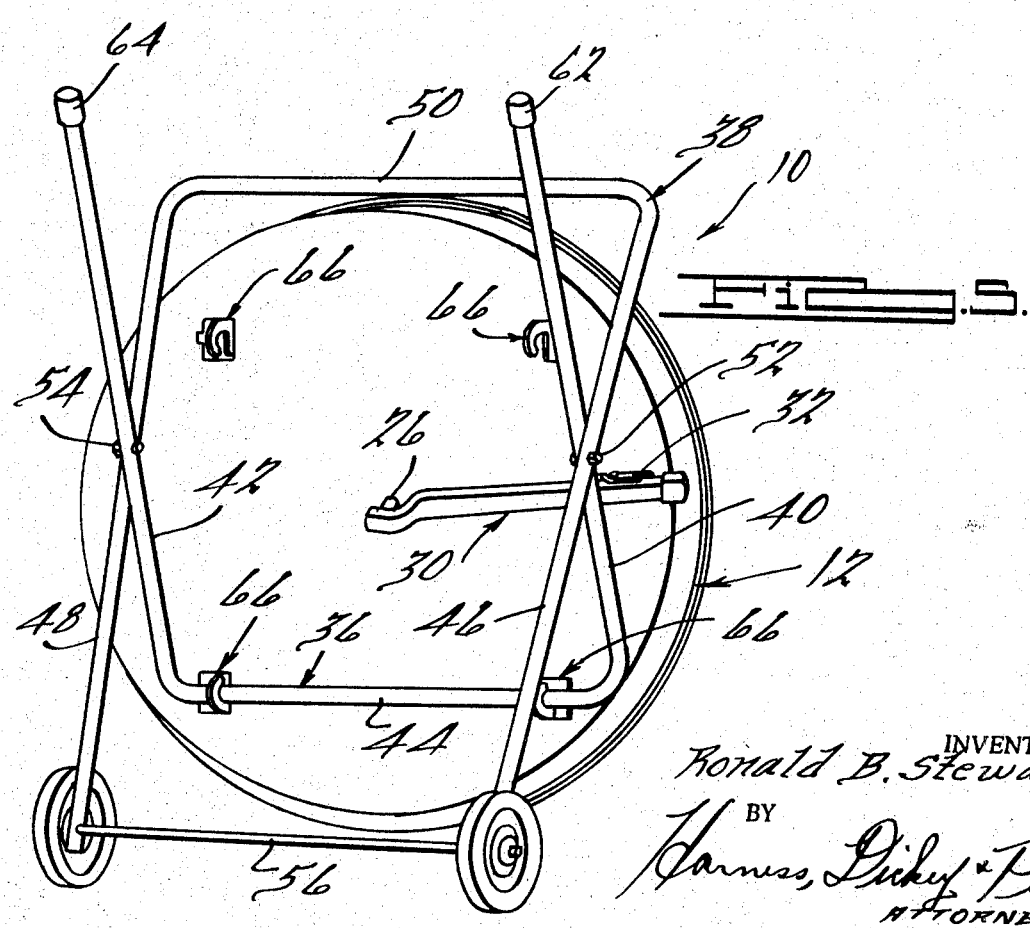

3,556,076

1

PORTABLE BARBECUE GRILL

BACKGROUND OF THE INVENTION

In barbecue grills of the type adapted to be stored, for example, in a residential garage, basement, etc., and which are designed to be periodically moved from such a storage location to a location that provides for convenient and safe operation thereof, it is highly desirable that the grill be adapted to be folded-up or compacted for storage purposes. Although portable barbecue grills have been known in the prior art which comprise support frames or structures adapted to be collapsed or folded so as to provide for such compactness during periods of storage, a great majority of such heretofore known and used barbecue grills have been objectionable from the standpoint of the complicated mechanisms required to permit folding and unfolding of the structure, as well as the various relatively complicated means utilized in positively maintaining the support structure in a collapsed or uncollapsed configuration.

The present invention relates to a new and improved barbecue grill assembly that is characterized by the provision of a pair of foldable or collapsible support legs and a plurality of support brackets which are adapted to cooperate with an associated brazier in positively securing the support legs in a preselected operative configuration without the use of any complicated fastening means, latches or the like. More particularly, the support brackets are oriented on the underside of the brazier in a manner such that the upper ends of the support legs are adapted to "snap" into annular recesses defined by the support brackets, with the brackets being dimensioned and arranged upon the brazier in a manner such that the upper ends of the support legs are subjected to a downwardly directed force by the lower side of the brazier, which force acts to positively, yet releasably, maintain the upper ends of the support legs within the recesses in the support brackets. Thus, the support legs of the barbecue grill assembly embodying the principles of the present invention may be conveniently collapsed and reassembled without requiring actuation or release of any ancillary locking mechanisms, yet the support legs will be positively maintained in an operational configuration with respect to the associated brazier so as to effectively prevent inadvertent collapsing or disassembly thereof.

SUMMARY OF THE INVENTION

This invention relates generally to barbecue grills and more particularly to a new and improved foldable or collapsible grill.

It is accordingly a general object of the present invention to provide a new and improved foldable barbecue grill.

It is a more particular object of the present invention to provide a barbecue grill of the above type which is characterized by the provision of a new and improved foldable leg structure.

It is still a more particular object of the present invention to provide a foldable barbecue grill having a new and improved means for releasably securing the support legs thereof to a generally horizontally disposed barbecue fuel supporting brazier.

It is a further object of the present invention to provide a new and improved barbecue grill assembly having foldable support legs adapted to be positively retained in an extended configuration without the use of any ancillary fastening or latching devices.

It is another object of the present invention to provide a new and improved barbecue grill assembly which is of a simple design, is easy to assembly and economical to commercially manufacture.

Other objects and advantages of the present invention will become apparent from the following detailed description taken in conjunction with the accompanying drawings.

2

Figures 1, 2:
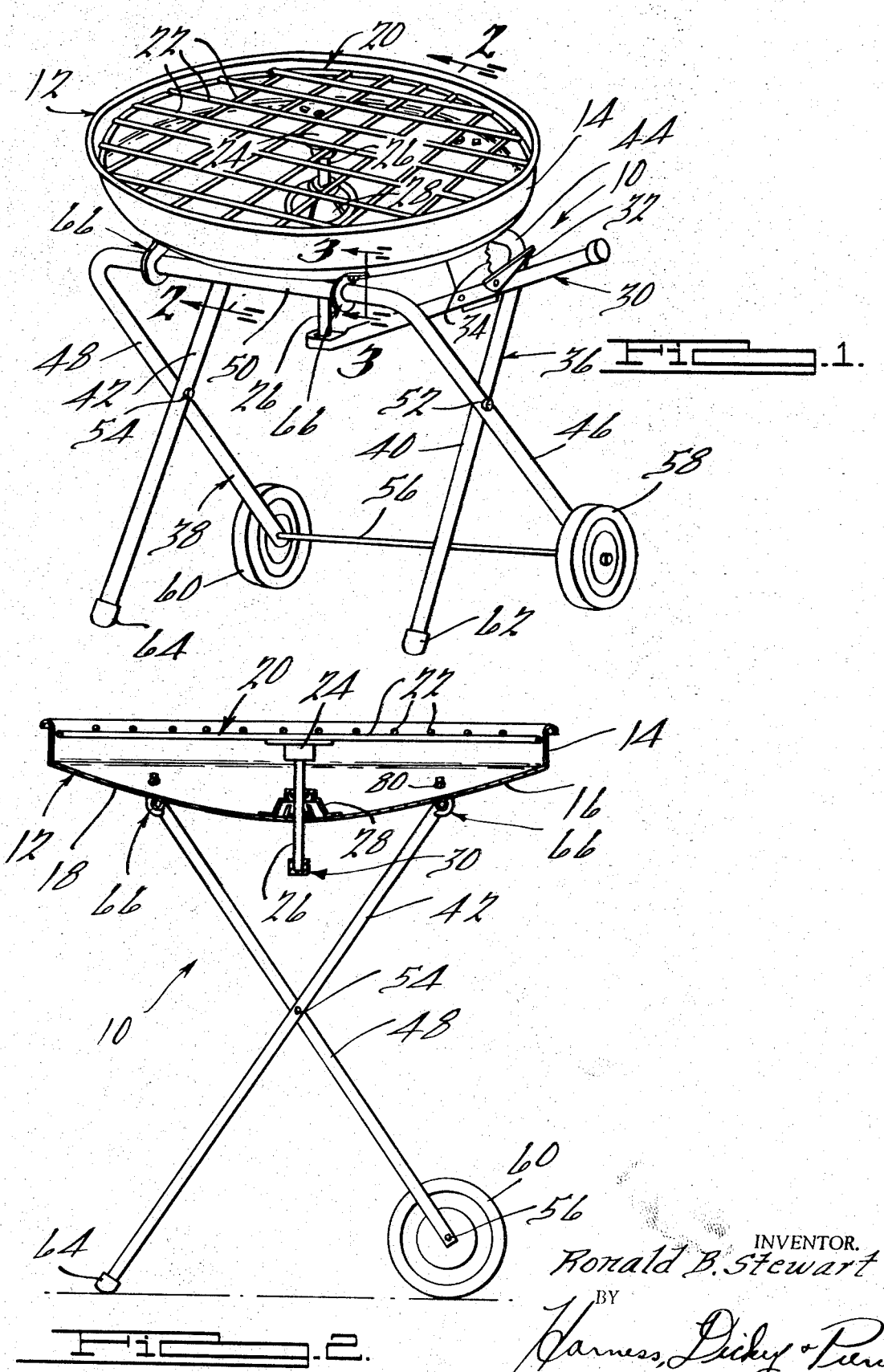
FIG. 1 is an elevated perspective view of a folding brazier embodying the principles of the present invention.

FIG. 2 is a transverse cross-sectional view taken substantially along the line 2—2 of FIG. 1.

FIG. 3 is an enlarged fragmentary cross-sectional view of the structure shown in FIG. 1, as taken substantially along the line 3—3 thereof.

FIG. 4 is a fragmentary side elevational view of the structure shown in FIG. 3, as taken in the direction of the arrow 4 therein.

FIG. 5 is an elevated perspective view of the brazier of the present invention, as shown in a folded or collapsed configuration.

DETAILED DESCRIPTION OF A PREFERRED EMBODIMENT

Referring now to the drawings, a foldable portable barbecue grill assembly, generally designated by the numeral 10, in accordance with a preferred embodiment of the present invention, is shown as comprising a circular or annular brazier 12 adapted to contain a bed of combustible barbecue fuel, such as charcoal, wood, coal, etc. The brazier 12 consists of an annular, generally vertically disposed sidewall section 14 and a lower side or bottom section 16 which is convex downwardly and defines a support surface 18 on the lower or underside thereof. The brazier 12 is shown as being equipped with the usual wire grill 20 having a plurality of cross rods 22 that are mounted by means of a suitable support collar 24 on the upper end of a central vertically disposed shaft 26. The shaft 26 and hence the grill 20 supported thereon are mounted for vertical adjustable movement within a generally conically shaped support shroud 28 disposed on and secured to the upper side of the brazier bottom section 16. A manually adjustable pivoted rocker arm 30 is provided on the brazier 12 and adapted to engage the lower end of the shaft 26 in the usual manner for effecting vertical movement of the shaft 26 and grill 20. A latch 32 is pivotably mounted on the rocker arm 30 near the handle end thereof and adapted to cooperate with a ratchet 34 to selectively adjustably lock the rocker arm 30 in a position maintaining the grill 20 at a preselected level or elevation with respect to the bed of burning fuel within the brazier 12, as is well known in the art.

The brazier 12 is adapted to be supported in its operative horizontal position by means of a pair of support legs, generally designated 36 and 38, which are arranged in a generally cross or X configuration subjacent the brazier 12. The support legs 36, 38 are each of a generally inverted U-shaped configuration, with the support leg 36 comprising a pair of spaced parallel side sections 40 and 42 and a generally horizontally disposed intermediate section 44 which is formed integrally of the side sections 40, 42 and extends between the upper ends thereof. Similarly, the support leg 38 comprises a pair of spaced parallel side sections 46, 48 and an intermediate section 50, as best seen in FIG. 1. The support legs 36, 38 are each of a generally hollow cylindrical configuration or tubular in transverse section, as best seen in FIG. 3, and are adapted to be pivotably connected to one another by means of a pair of suitable pivot pins, screws, bolts or the like 52 and 54 which pivotably connect the leg sections 40, 46 and 42, 48, respectively. A generally horizontally extending shaft or axle 56 extends between and through the leg sections 46 and 48 of the support leg 38 and is adapted to support a pair of rotatable wheels 58 and 60 at a position outboard of the lower ends thereof. As will be apparent, the wheels 58, 60 are adapted to permit the grill 10 to be rolled between a storage location and a location wherein the grill 10 is to be put to operative use. The lower ends of the leg sections 40 and 42 of the support leg 36 are provided with suitable end caps or the like 62 and 64, respectively, which are adapted to close the lower ends of the sections 40, 42.

In accordance with the principles of the present invention, the support legs 36, 38 are adapted to be operatively connected to the underside or support surface 18 of the brazier 12 by means of a plurality of bracket members, generally designated 66, which are arranged in two spaced parallel rows, with each row having a pair of the members 66. As best seen in FIGS. 3 and 4, each of the bracket members 66 is of a generally L-shaped configuration and comprises a generally vertically extending support section 68 and a generally upwardly and outwardly inclined mounting section 70 that is adapted to be contiguously engaged with the support surface 18. The mounting section 70 of each of the members 66 comprises an upwardly extending tab portion 72 at one end thereof which is adapted to be inserted through a suitable opening 74 formed in the bottom section 16 of the brazier 12, as best seen in FIG. 4. The mounting section 70 of each of the members 66 is also formed with a suitable opening or bore 76 which is adapted to be aligned with a corresponding opening or bore 78 formed in the bottom section 16 upon operatively inserting the tab portion 72 within the associated opening 74. Fastening means in the form of suitable screws, bolts or the like 80 extend through the aligned openings 76, 78 at each of the members 66, which are provided with suitable nuts 82, and thereby cooperate with the tab portions 72 in fixedly securing the bracket members 66 to the underside of the brazier 12. It will be seen that by virtue of the provision of the tab portions 72 on each of the bracket mounting sections 70, only a single fastening screw, bolt or the like is required on each of the brackets 66 to effect positive attachment thereof to the support surface 18.

As best seen in FIG. 3, the support sections 68 of the brackets 66 are of a generally hooked-shaped configuration and define annular recesses 84 which are preferably slightly larger in diameter than the diameter of the intermediate sections 44 and 50 of the support legs 36, 38, respectively, and are thereby adapted to removably receive the intermediate leg sections 44, 50 in a manner hereinafter to be described. The brackets 66 are mounted on the support surface 18 in a manner such that the support sections 68 of each associated pair thereof are arranged in spaced parallelism, with the annular recesses 84 of each pair being aligned with one another so as to cooperate in defining a pair of elongated spaced parallel channels within which the intermediate leg sections 44 and 50 are adapted to be received. In accordance with the principles of the present invention, the support sections 68 are dimensioned such that the longitudinal center lines of the elongated channels defined by the recesses 84 are spaced away from the support surface 18 a distance slightly less than the radius of the intermediate leg sections 44, 50. That is, the bracket members 66 are dimensioned and arranged on the surface 18 such that the center portion of the brazier 12 projects downwardly between each associated pair of members 66 and into the channels defined by the annular recesses 84 thereof, with the amount that the central portion of the brazier 12 projects between the bracket members 66 being slightly greater than the radius of the intermediate sections 44, 50 of the support legs 36, 38. With this construction, when the leg sections 44, 50 are received within the pairs of aligned recesses 84 of the bracket members 66, there is a certain amount of interference between the upper sides of the intermediate leg sections 44, 50 and the support surface 18 defined by the bottom section 16 of the brazier 12, as seen at 86 in FIG. 4. The bracket members 66 are dimensioned such that the magnitude of the aforesaid interference between the surface 18 and the intermediate leg sections 44, 50 is sufficient to positively, yet releasably, retain the leg sections 44, 50 within the recesses 84. Thus, when the intermediate sections 44, 50 of the support legs 36, 38 are operatively inserted within the recesses 84 of the bracket members 66, the bottom section 16 of the brazier 12 exerts a downwardly directed compressive force against the portions of the leg sections 44, 50 extending between the associated pairs of bracket members 66, which compressive force acts to positively maintain the sections 44, 50 operatively engaged with the bracket members 66.

In operation, during normal storage of the barbecue grill assembly 10 of the present invention, the intermediate section 50 of the support leg 38 may be disengaged from one of the pair of support bracket members 66 and the legs 36, 38 may be folded or collapsed into a position where they are substantially parallel to the brazier 12. In this configuration, the assembly 10 is substantially flat and may be easily stored in a minimum amount of space. If desired, the entire assembly 10 may be hung on a wall or the like by means of suitable hooks or the like which may be engaged with the intermediate leg section 50. At such time as it is desired to put the grill assembly 10 of the present invention to use, the support legs 36, 38 thereof may be pivotably biased about the axis defined by the pivot pins or the like 52, 54 from the folded position shown in FIG. 5 to the unfolded or extended position shown in FIG. 2. After the legs 36, 38 have thus been unfolded, the intermediate section 50 of the support leg 38 may be "snapped" into the recesses 84 defined by the associated pair of brackets 66, as above described. As the intermediate section 50 moves into the channel defined by the pair of aligned recesses 84, the bottom section 16 of the brazier 12 will exert a slight downwardly directed force against the upper side of the leg section 50, thereby positively maintaining the same engaged with the associated brackets 66. It will be noted, of course, that if it is desired to completely disengage both of the support legs 36, 38 from the brazier 12, both the intermediate sections 44 and 50 thereof may be disengaged from their respective brackets 66; however, for normal storage, it will usually only be necessary to disengage one of the legs 36, 38 from its associated pair of brackets 66, since the brackets 66 associated with the other of the legs will permit free pivotal movement of the brazier 12 relative thereto so that convenient folding of the legs 36, 38 may be effectuated.

A particular feature of the above-described construction resides in the fact that the upper ends of the support legs 36, 38 are positively, yet releasably, maintained engaged with the associated brackets 66, without the use of any ancillary fastening means, latches or the like. Thus, the grill assembly 10 of the present invention may be conveniently assembled and disassembled without the use of any tools or special release mechanisms, as has frequently been necessary with barbecue grill assemblies of the prior art. A related feature of the present invention will be seen in the savings in assembly time and attendant manufacturing expenses resulting from a design which is entirely devoid of any special latching mechanisms for retaining the support legs 36, 38 in their respective support positions. Thus, the present invention is characterized by an extremely simple design that can be economically manufactured and conveniently assembled and disassembled when desired.

While it will be apparent that the preferred embodiment illustrated herein is well calculated to fulfill the objects above stated, it will be appreciated that the present invention is susceptible to modification, variation and change without departing from the proper scope or fair meaning of the subjoined claims.

I claim:

1. In combination with an article to be supported in an elevated position:
   means defining a surface below the article having first and second vertically spaced portions;
   at least one support leg for supporting the article;
   bracket means located on the uppermost of said vertically spaced portions of said surface for operatively securing the upper end of said leg in an article supporting position; and
   said upper end of said leg being engageable with both said bracket and with the lowermost of said vertically spaced portions of said surface, whereby said leg will be releasably maintained in said article supporting position.

2. The combination as set forth in claim 1 wherein said article comprises a brazier defining said surface on the underside thereof.

3. The combination as set forth in claim 2 wherein said bracket means is generally hooked-shaped and adapted to removably receive said upper end of said support leg.

4. The combination as set forth in claim 2 wherein the underside of said brazier is of a convex downwardly configuration.

5. The combination as set forth in claim 4 wherein said support leg is of a generally inverted U-shaped configuration and defines a pair of spaced parallel support sections and an intermediate section extending between said support sections, which includes a pair of support brackets secured on said surface, and wherein said intermediate section of said support leg is engageable with said lowermost of said vertically spaced portions of said surface at a position interjacent said brackets for releasably maintaining said leg engaged with said brackets.

6. The combination as set forth in claim 3 wherein the underside of said brazier defines a support surface, wherein said upper end of said leg is of a generally cylindrical configuration, and wherein said bracket means defines a generally circular recess adapted to removably receive said cylindrical portion of said leg, said bracket means being mounted on said surface at a position wherein the center of said recess is spaced above said lowermost portion of said surface, whereby said cylindrical leg portion is engageable with said lowermost portion of said surface to releasably maintain said intermediate leg portion engaged within said recess of said bracket means.

7. The combination as set forth in claim 6 wherein said support leg is of a generally U-shaped configuration and defines a pair of spaced parallel support sections and an intermediate section extending between said support sections, which includes a pair of support brackets secured on said uppermost portions of said surface, and wherein said intermediate section of said support leg is engageable with said lowermost portions of said surface at a position interjacent said brackets for releasably maintaining said leg engaged with said brackets.

8. The combination as set forth in claim 2 wherein said bracket means comprises a plurality of generally L-shaped bracket members, each of said members comprising an upper mounting section adapted to be fixedly secured to the underside of said brazier and a generally vertically extending section adapted to be detachably engaged with said upper end of said support leg.

9. The combination as set forth in claim 8 wherein the underside of said brazier defines a generally convex downwardly support surface, wherein said bracket members define a pair of spaced parallel channels, which includes a pair of generally U-shaped support legs each of which comprises a generally horizontally extending intermediate section adapted to be pivotably received within one of said channels.

10. The combination as set forth in claim 9 wherein said bracket members are arranged in aligned pairs, wherein said intermediate leg sections are of a generally cylindrical configuration, wherein said lowermost portion of said surface projects downwardly between the bracket members of each of said pairs a distance greater than the radius of said intermediate sections of said support legs, whereby said lowermost portion of said surface is engageable with said intermediate leg sections to releasably maintain said support legs operatively engaged with said bracket members.

11. The combination as set forth in claim 2 which includes a pair of generally inverted U-shaped support legs, said legs being pivotably connected to the underside of said brazier by said bracket means and being foldable into substantial parallel relation to said brazier upon disengagement of one of said support legs from said bracket means.

12. The combination as set forth in claim 9 wherein said bracket members are arranged in aligned pairs, wherein said intermediate leg sections are of a generally cylindrical configuration, wherein said support surface projects downwardly between the bracket members of each of said pairs a distance greater than the radius of said intermediate sections of said support legs, whereby said surface is engageable with said intermediate leg sections to releasably maintain said support legs operatively engaged with said bracket members, and wherein said legs are foldable into substantial parallel relation to said brazier upon disengagement of one of said support legs from said bracket means.

13. In combination in a barbecue grill assembly:
means defining a brazier the underside of which has preselected portions at different vertical heights;
a pair of foldable support legs for supporting said brazier;
bracket means on the uppermost of said preselected portions of said brazier supporting said legs for swinging movement between positions supporting and not supporting said brazier in a generally horizontal operative position; and
interengageable means including the lowermost of said preselected portions of said brazier and said legs for releasably maintaining said legs operatively engaged with said bracket means.

14. The combination as set forth in claim 13 wherein said bracket means are generally hooked-shaped and adapted to removably receive portions of said support legs.

15. The combination as set forth in claim 13 wherein the underside of said brazier defines a concave downwardly support surface, and wherein said legs are engageable with said lowermost of said preselected portions of said brazier to releasably maintain said legs engaged with said bracket means.

16. The combination as set forth in claim 15 wherein said support legs are of a generally inverted U-shaped configuration and define pairs of spaced parallel support sections and intermediate sections extending between said support sections, which includes two pair of support brackets secured on said support surface, and wherein said intermediate sections of said support legs are engageable with said surface at positions interjacent the brackets of each of said pairs thereof for releasably maintaining said legs engaged with said brackets.

17. The combination as set forth in claim 13 which includes a pair of generally inverted U-shaped support legs, said legs being pivotably connected to the underside of said brazier by said bracket means and being foldable into substantial parallel relation to said brazier upon disengagement of one of said support legs from said bracket means.

18. In combination in a barbecue grill assembly:
means defining a brazier;
a pair of foldable support legs for supporting said brazier;
bracket means on said brazier supporting said legs for swinging movement between positions supporting and not supporting said brazier in a generally horizontal operative position;
interengageable means on said brazier and said legs for releasably maintaining said legs operatively engaged with said bracket means; and
said bracket means defining generally circular recesses adapted to removably receive generally cylindrical portions of said legs, said bracket means being mounted on a generally downwardly convex surface defined by said brazier at a position wherein the center of said recesses are spaced away from said surface a distance less than the radius of said cylindrical leg portions, whereby said leg portions are engageable with said surface to releasably maintain said leg portions received within said bracket means.

19. The combination as set forth in claim 18 wherein said support legs are of generally U-shaped configuration and define pairs of spaced parallel support sections and intermediate sections extending between said support sections, which includes two pair of support brackets secured on said surface, and wherein said intermediate sections of said support legs are engageable with said surface at positions interjacent the brackets of each of said pairs thereof for releasably maintaining said legs engaged with said brackets.

20. In combination in a barbecue grill assembly:
means defining a brazier;
a pair of foldable support legs for supporting said brazier;
bracket means on said brazier supporting said legs for swinging movement between positions supporting and not supporting said brazier in a generally horizontal operative position;
interengageable means on said brazier and said legs for releasably maintaining said legs operatively engaged with said bracket means;

said bracket means comprising a plurality of generally L-shaped bracket members, each of said members comprising an upper mounting section adapted to be fixedly secured to the underside of said brazier and a generally vertically extending section adapted to be detachably engaged with the upper ends of said support legs; and the underside of said brazier defining a generally downwardly convex support surface and said bracket members defining a pair of spaced parallel channels, with each of said legs comprising a horizontally extending intermediate section adapted to be pivotably received within one of said channels.

21. The combination as set forth in claim 20 wherein said bracket members are arranged in aligned pairs, wherein said intermediate leg sections are of a generally cylindrical configuration, wherein said support surface projects downwardly between the bracket members of each of said pairs a distance greater than the radius of said intermediate sections of said support legs, whereby said surface is engageable with said intermediate leg sections to releasably maintain said support legs operatively engaged with said bracket members.

22. In combination in a barbecue grill assembly:

means defining a brazier;

a pair of foldable support legs for supporting said brazier and each comprising a pair of spaced parallel support sections and a cylindrical intermediate section;

a plurality of bracket members arranged in aligned pairs on said brazier supporting said legs for swinging movement between positions supporting and not supporting said brazier in a generally horizontal operative position;

interengageable means including a support surface on the underside of said brazier and said intermediate sections of said legs for releasably maintaining said legs operatively engaged with said bracket means; and said support surface projecting downwardly between said bracket members of each of said pairs a distance greater than the radius of said intermediate sections of said support legs, whereby said surface is engageable with said intermediate leg sections to releasably maintain said support legs operatively engaged with said bracket members, said legs being foldable into substantial parallel relation to said brazier upon disengagement of one of said support legs from said bracket members.